H. C. HANSON.
CORN PLANTER.
APPLICATION FILED DEC. 20, 1909.
963,548.
Patented July 5, 1910.
3 SHEETS—SHEET 1.
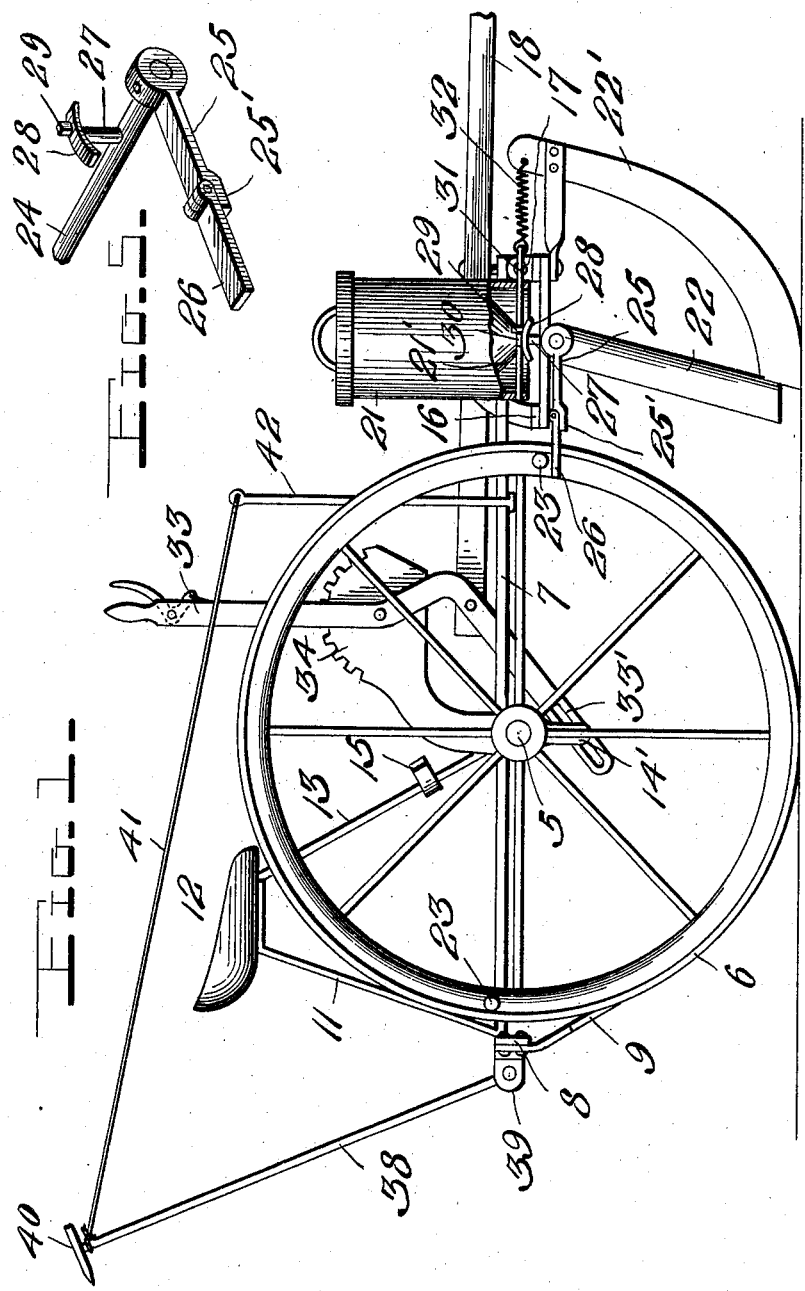

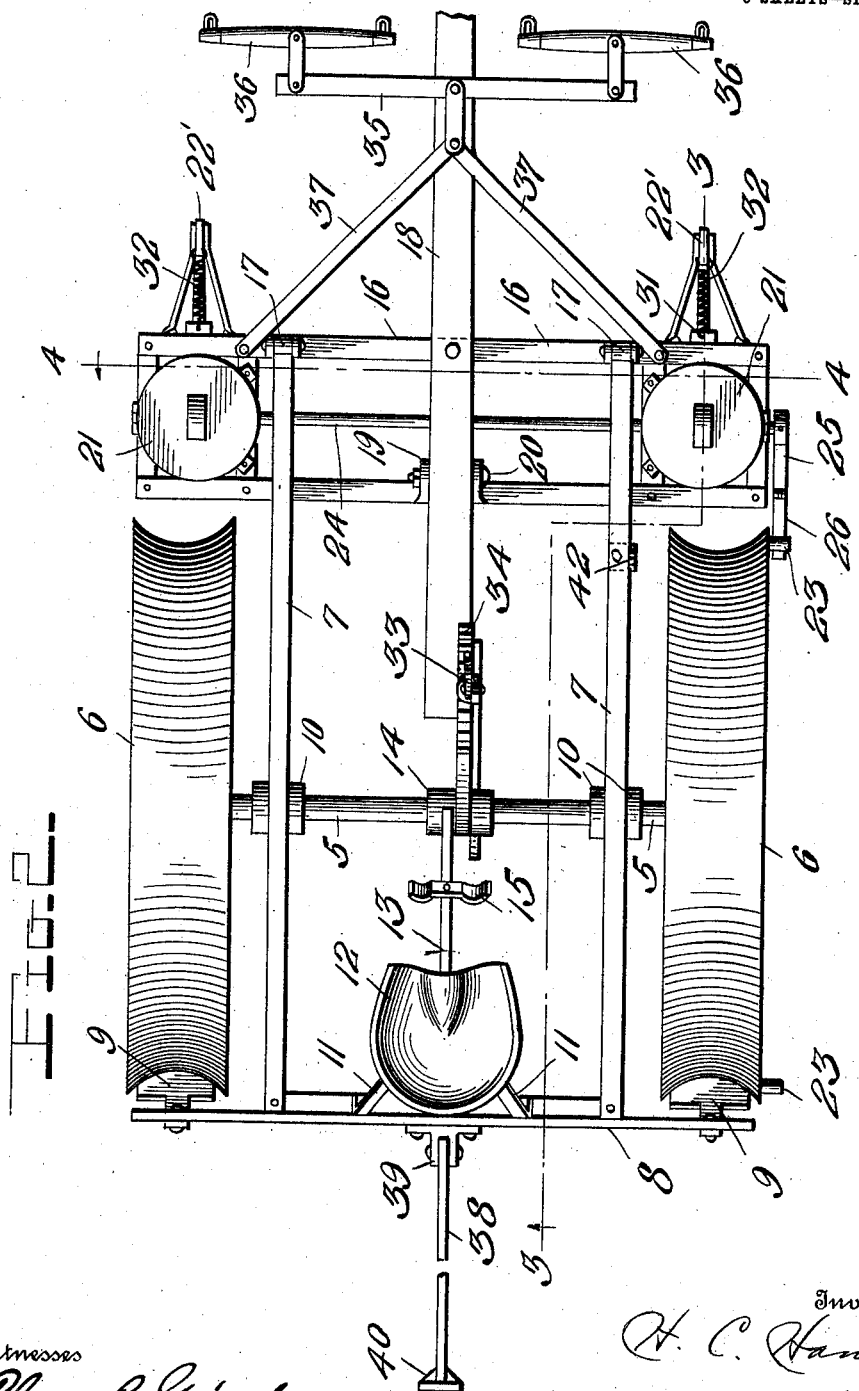

H. C. HANSON.
CORN PLANTER.
APPLICATION FILED DEC. 20, 1909.
963,548.
Patented July 5, 1910.
3 SHEETS—SHEET 3.
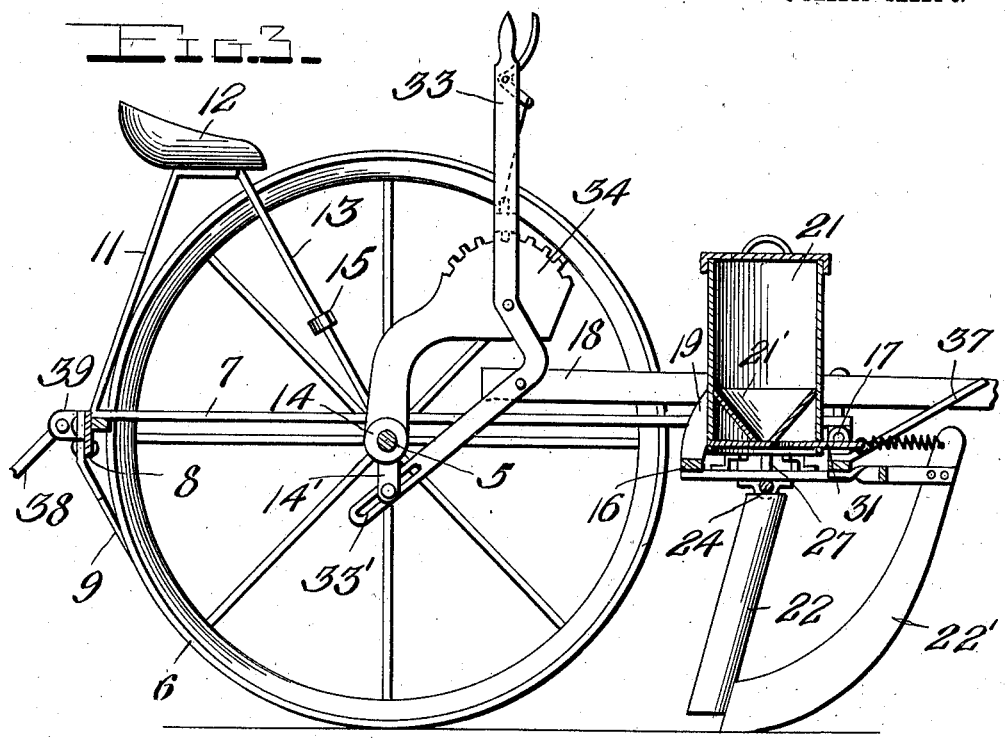
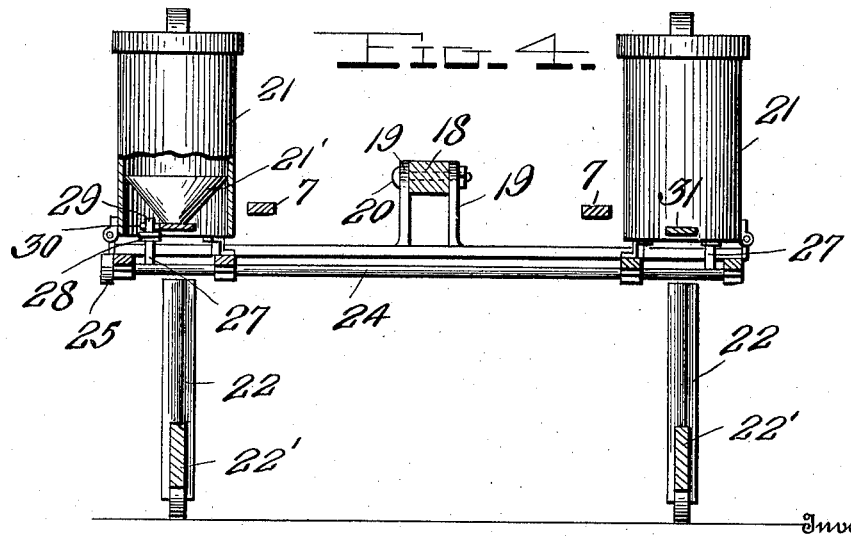
Witnesses
Chas. L. Griesbauer.
E. M. Ricketts
Inventor
H. C. Hanson
By Nathan E. Coleman
Attorney

UNITED STATES PATENT OFFICE.

HANS C. HANSON, OF LACLEDE, MISSOURI.

CORN-PLANTER.

963,548.   Specification of Letters Patent.   Patented July 5, 1910.

Application filed December 20, 1909. Serial No. 534,030.

*To all whom it may concern:*

Be it known that I, HANS C. HANSON, a citizen of the United States, residing at Laclede, in the county of Linn and State of Missouri, have invented certain new and useful Improvements in Corn-Planters, of which the following is a specification, reference being had to the accompanying drawings.

This invention relates to certain new and useful improvements in corn planters and has for its object to provide a machine of this character of comparatively simple construction, whereby the corn may be intermittently dropped and planted in rows of hills, said machine being provided with a suitable marking element whereby said rows may be planted parallel with each other.

A further object is to provide new and novel means for mounting the seed boxes and furrow opening shoes, and to provide means for adjusting the same whereby the shoes may be raised or lowered to regulate the depth to which the seeds are deposited in the soil.

With these and other objects in view, the invention consists of the novel features of construction and the combination and arrangement of parts hereinafter fully described and claimed, and illustrated in the accompanying drawings, in which—

Figure 1 is a side elevation of a corn planter constructed in accordance with the present invention; Fig. 2 is a top plan view thereof; Fig. 3 is a section taken on the line 3—3 of Fig. 2; Fig. 4 is a section taken on the line 4—4 of Fig. 2, and Fig. 5 is a detail perspective view of one end of the seed dropping rock shaft.

Referring to the drawings 5 indicates a wheel supporting shaft or axle upon each end of which the traction or drive wheels 6 are revolubly secured. A longitudinally positioned frame 7 is pivotally mounted upon the axle 5 between the traction wheels and extends forwardly thereof. To the rear end of this frame a transverse bar 8 is secured and has attached adjacent to its ends the scraper plates 9 which engage with the periphery of the wheel and remove the dirt which accumulates thereon. The bearing sleeves 10 of the frame 7 may be provided with suitable roller bearings to prevent friction therein as the driving axle is rotated. On the rear transverse bar of the frame 7 a vertical support 11 is arranged upon the upper end of which the driver's seat 12 is secured. A diagonally and forwardly extending rod or bar 13 is secured to this seat and has its forward end rigidly attached to a sleeve 14 loosely positioned centrally on the axle. The diagonal supporting bar is provided with the foot rests 15 upon which the operator places his feet.

Upon the forward end of the longitudinally positioned frame 7 a transverse frame 16 is arranged. The forward longitudinal bar of this frame is pivotally connected to the side bars of the frame 7, as shown at 17. The tongue 18 extends over the frame 16 and is positioned between the bracket plates 19 which are secured upon the rear transverse bar of the frame and a bolt 20 extends through the tongue and connects said brackets. Adjacent to either end of the transverse frame a seed box 21 is mounted and is adapted to deposit the seed into the depending conducting tube 22 which is secured at each end to the opposite transverse bars of the frame 16. The seed boxes are each provided with the inwardly extending bottom plates which directs the seed into the conducting tubes. The runners or furrow openers 22' of the tubes are adapted to cut into the soil in the usual manner to deposit the seed at the proper depth.

In order to intermittently drop the seed I provide the following mechanism: At diametrically opposite points upon one of the drive wheels 6 a transversely extending stud or arm 23 is secured. A transverse rock shaft 24 extends centrally through the frame 16 and is oscillatably mounted in the ends thereof. To one end of this shaft the arm 25 is secured. This arm extends rearwardly and has hinged to its end a second arm 26 which is adapted to be engaged by the transversely extending studs carried by the traction wheels. The arm 26, however, is only adapted to be engaged by the studs to drop the seed when the wheels 6 are rotating in one direction as the machine is moving forwardly. A vertically extending arm 27 is secured to the shaft 24 adjacent each end and carries an arcuate plate 28 to which is secured the stud 29. This stud engages with the transverse arm 30 formed upon a slidable seed plate 31. This seed plate is arranged beneath the bottom of the seed box and is adapted to be held in its normal position by means of the retractile spring 32, the forward end of which is secured to the furrow opening shoe and its other end to the seed plate. Thus it will be noted that as the drive wheels rotate and the arms or studs 23 successively engage with the arms 26, the upright 27 oscillates as the stud 29 is brought into engagement with the arm 30 whereby the seed plate will be reciprocated and an opening therein brought into alinement with the opening formed by the inwardly inclined bottom plates 21' so that the seed may fall through the same and into the shoe. A short rearwardly extending plate 25' extends from the bottom of the arm 25 to and beneath the arm 26, whereby the downward movement of said arm is prevented.

In order to raise the furrow opening shoe from the ground when it is desired to turn the machine and to regulate the planting depth of the seed, I provide a lever 33 which is pivotally carried on the rear end of the tongue 18. This lever is in the form of a bell crank and extends rearwardly between the spaced ears 14' formed upon the central sleeve 14. The lever is provided with a longitudinal slot 33' through which a transverse pin connecting the ears 14' extends. Thus the lever is adapted to have sliding movement between the ears as the same is operated to lift the transverse frame 16. The lever is also pivoted intermediate of its ends upon a rack segment 34 which is secured upon the central sleeve 14 on the axle 5. Thus as the operator's weight is all upon the rear part of the longitudinal frame 7, when the lever 33 is grasped and swung rearwardly upon its pivot, the tongue and transverse frame 16 will be lifted upon the pivot pins 17 and the furrow opening shoes thus elevated from contact with the ground. The operating lever, of course, carries the usual spring pressed manually operated dog which engages with the teeth of the rack to secure the lever in its adjusted position. A doubletree 35 is arranged upon the tongue 18 and carries the swingletrees 36 to which the draft animals are attached. The tongue is further braced and supported from the transverse frame by means of the diagonally extending bars 37.

In order to provide suitable marking means whereby the rows of corn hills may be kept parallel as the machine is moved from end to end of the field, I provide the rod or bar 38 which is pivoted in a U-shaped clip 39 carried by the rear transverse bar of the longitudinal frame 7. This pivoted rod is provided with a marking foot 40 which is adapted to engage with the surface of the ground and indicate an intermediate position between the rows of corn hills. Thus on the return trip of the machine one of the traction wheels can be positioned on this line so marked and kept in such position until the opposite end of the field is reached, thus planting the hills in parallel rows.

When the marker is not being used it may be raised and supported in an elevated position by means of the wire 41 which is connected to the upper end of a vertical standard 42 secured to one of the longitudinal frame bars of the main frame 7.

From the foregoing it is believed that the operation and many advantages of my improved corn planter will be obvious without requiring a more extended description.

The various parts are entirely automatic in their operation and are positively actuated to intermittently drop the corn at suitable intervals. It will, of course, be understood that a greater number of the transversely extending studs 23 may be provided upon the traction wheels whereby the corn dropping mechanism may be operated at shorter or longer intervals as desired.

The entire forward part of the machine may be quickly elevated by the manipulation of the lever 33 without requiring a great amount of exertion upon the part of the operator, as his weight greatly assists in counterbalancing the weight of the feed boxes and furrow opening shoes.

Comparatively few parts are employed in the construction of the machine and it will, therefore, be obvious that the expense of manufacture is reduced to a minimum.

While I have shown and described what I believe to be the preferred embodiment of the invention, it will be understood that numerous minor modifications may be resorted to without departing from the essential features or sacrificing any of the advantages thereof.

Having thus described the invention what is claimed is:

1. In a machine of the character described, the combination with a wheeled frame, of a transverse frame pivotally mounted beneath the forward end of said wheeled frame, seed boxes supported thereon, a reciprocatory seed plate arranged in the bottom of each of said boxes adapted to drop a predetermined amount of seed, a rock shaft extending beneath said seed boxes, a laterally and rearwardly extending arm secured to one end of said rock shaft, a plurality of outwardly extending studs carried by one of the drive wheels adapted to engage said arm to rock the shaft, means carried by the shaft engaging with said seed plates to reciprocate the same when the shaft is rocked, means for preventing the rotation of said shaft upon the reverse movement of the drive wheels and a spring connected to each of the seed plates to return the same to its normal position after the seed has been dropped.

2. In a machine of the character described, the combination with a wheeled frame, of a transverse frame pivotally mounted beneath the forward end of said wheeled frame, a transversely extending rock shaft mounted on said transverse frame, a seed box carried by said frame above each end of the shaft, a reciprocatory seed plate arranged in the bottom of each of said boxes and adapted to deposit a predetermined amount of seed, a vertical arm secured to each end of said rock shaft adapted to engage with the seed plates to reciprocate the same, an arm extending laterally and rearwardly from one end of the rock shaft formed in two hinged sections, studs carried by one of the drive wheels engaging the rear arm section to rock the shaft and reciprocate said seed plates, and a spring secured to each of the seed plates adapted to return the same to its normal position after the seed has been dropped.

3. In a machine of the character described, the combination with an oscillatory wheel supported frame, of a transverse frame pivotally mounted beneath the forward end of the wheeled frame, a rock shaft carried thereby, seed boxes arranged on said frame above each end of the rock shaft, a reciprocatory seed plate arranged in the bottom of each of said boxes having an opening therein, a transversely extending arm formed on each of said seed plates, a vertical arm carried by the rock shaft engaged with the arm of said seed plate, an arm extending laterally and rearwardly from one end of the rock shaft, said arm being formed in two hinged sections, the rear section being supported by the extremity of the other section against independent downward movement, outwardly extending studs carried by one of the drive wheels engaging the rear arm section to rock said shaft and reciprocate the seed plates to permit of the deposit of the seed through the openings therein, and a spring secured to the forward end of each of said plates and adapted to return the same to their normal positions after the seed has been dropped.

In testimony whereof I hereunto affix my signature in the presence of two witnesses.

HANS C. HANSON.

Witnesses:
   ERNEST E. BENSON,
   NOVIE E. RANDALL.